United States Patent [19]

Fraser

[11] Patent Number: 4,499,576
[45] Date of Patent: Feb. 12, 1985

[54] MULTIPLEXED FIRST-IN, FIRST-OUT QUEUES

[75] Inventor: Alexander G. Fraser, Bernardsville, N.J.

[73] Assignee: AT&T Bell Laboratories, Murray Hill, N.J.

[21] Appl. No.: 407,885

[22] Filed: Aug. 13, 1982

[51] Int. Cl.³ .............................................. H04J 3/00
[52] U.S. Cl. ........................................ 370/60; 370/94
[58] Field of Search .................................. 370/60, 94

[56] References Cited

U.S. PATENT DOCUMENTS

| | | | |
|---|---|---|---|
| 3,979,733 | 9/1976 | Fraser ................................ | 340/172.5 |
| 4,312,065 | 1/1982 | Ulug ...................................... | 370/94 |
| 4,314,367 | 2/1982 | Bakka et al. .......................... | 370/60 |
| 4,365,328 | 12/1982 | Merriaux et al. ...................... | 370/60 |

FOREIGN PATENT DOCUMENTS 2472245 12/1979 France .
0033672 12/1981 France .

OTHER PUBLICATIONS

"An Architecture for a Flexible Integrated Voice/Data Switch", Ross, Gottschalck et al, ICC '80, Seattle, WA. (8–12 Jun. 1980).

"A Distributed Processing Architecture for Voice/Data Switching", Ross, Garrigus, NAECON 1981, Proceedings of the IEEE, Dayton, OH (19–21 May 1981).

"Experimental Packet Switched Service: Procedures and Protocols Part I", Neil et al, Post Office Electrical Engineers' Journal, vol. 67, pt. 4, pp. 232–239, Jan. 1975.

*Primary Examiner*—Douglas W. Olms
*Assistant Examiner*—Kenneth I. Rokoff
*Attorney, Agent, or Firm*—Robert O. Nimtz

[57] ABSTRACT

Messages, comprising a plurality of multiplexed packets of information bits, are received on a transmission line from each of a plurality of sources. All packets from the same source have the same source identification number and are stored in one of a plurality of first-in, first-out queues. After at least one of said packets has been stored, it is available for being read out from the first-in, first-out queue. In order to insure that each queue has an equal chance of being accessed by a utilization means, the status of all queues is registered in a status register.

3 Claims, 6 Drawing Figures

MULTIPLEXED FIRST-IN, FIRST-OUT QUEUES

TECHNICAL FIELD

This invention relates to digital transmission systems and, in particular, to a plurality of first-in, first-out queues for the temporary storage of a plurality of messages.

BACKGROUND OF THE INVENTION

In an application by Mr. A. G. Fraser, Ser. No. 407,877, filed concurrently herewith, there is disclosed a first-in, first-out (FIFO) queue. The FIFO queue temporarily stores a message received as a plurality of packets of digital bits over a transmission line from a source. Only when a complete message has been stored will it become available for retransmission.

Often, a plurality of messages from different sources are multiplexed onto the same transmission line. As in the single FIFO device disclosed in the aforesaid Fraser application, it becomes necessary sometimes to store these multiple messages temporarily, using a single random access memory because a single large memory is less expensive than many smaller memories. It is essential, however, that the messages from a single source, thus stored, become available for retransmission in the first-in, first-out order but it is not necessary that messages from different sources be retransmitted in FIFO order. Unlike the aforesaid Fraser application, however, it is useful to be able to read information from a FIFO queue after at least one packet has been stored therein.

The variation in delay experienced by the messages from one source depends critically upon the message traffic from other sources. For example, short messages from an interactive computer terminal may experience unacceptable delay if these messages are queued behind many large blocks of data from another source. It is desirable to have an arrangement so that, in the aforesaid example, short messages from the interactive terminal may be read from the queue storage memory, if so required, before all of the large blocks of data from the other source are received.

SUMMARY OF THE INVENTION

In accordance with the illustrative embodiment of the present invention, there is disclosed an apparatus for temporarily storing a plurality of messages in a plurality of first-in, first-out queues, fabricated from a single random access memory. Each message comprising one or more packets of information bits is identified with a source. Each packet comprises an identification number for identifying the source of the packet. The packets from different sources may be multiplexed onto a transmission line and are received at the aforesaid first-in, first-out queue storage apparatus.

Each packet received at the aforesaid apparatus is identified, assigned to one of the aforesaid first-in, first-out queues and stored therein.

The status of each first-in, first-out queue is available for being monitored by a utilization means, such as a computer, to determine when at least one packet is stored therein. The packets are read from each queue at the discretion of the utilization means.

Additionally, when required in a particular application, the status of each first-in, first-out queue may be monitored to determine when each message has been completely entered therein. Only after a complete message has been stored in a first-in, first-out queue will the message be able to be read therefrom.

In order to insure that each FIFO queue has an equal chance of being read, there are provided two sets of registers for recording the status of the queues. The status of each queue is separately entered in the first set of registers. The status of all the queues in the first set of registers is copied into the second set of registers after the second set has been scanned by a utilization means. An advantage of this scheme is that it provides a uniform grade of service to all queues by treating the queues equally.

An advantage of the present invention is the use of a single random access memory shared by many first-in, first-out queues. Furthermore, the use of multiple queues facilitates better traffic handling because shorter messages and longer messages have an equal chance of being read.

DETAILED DESCRIPTION

Single First-in, First-out Queue

Figure 1:
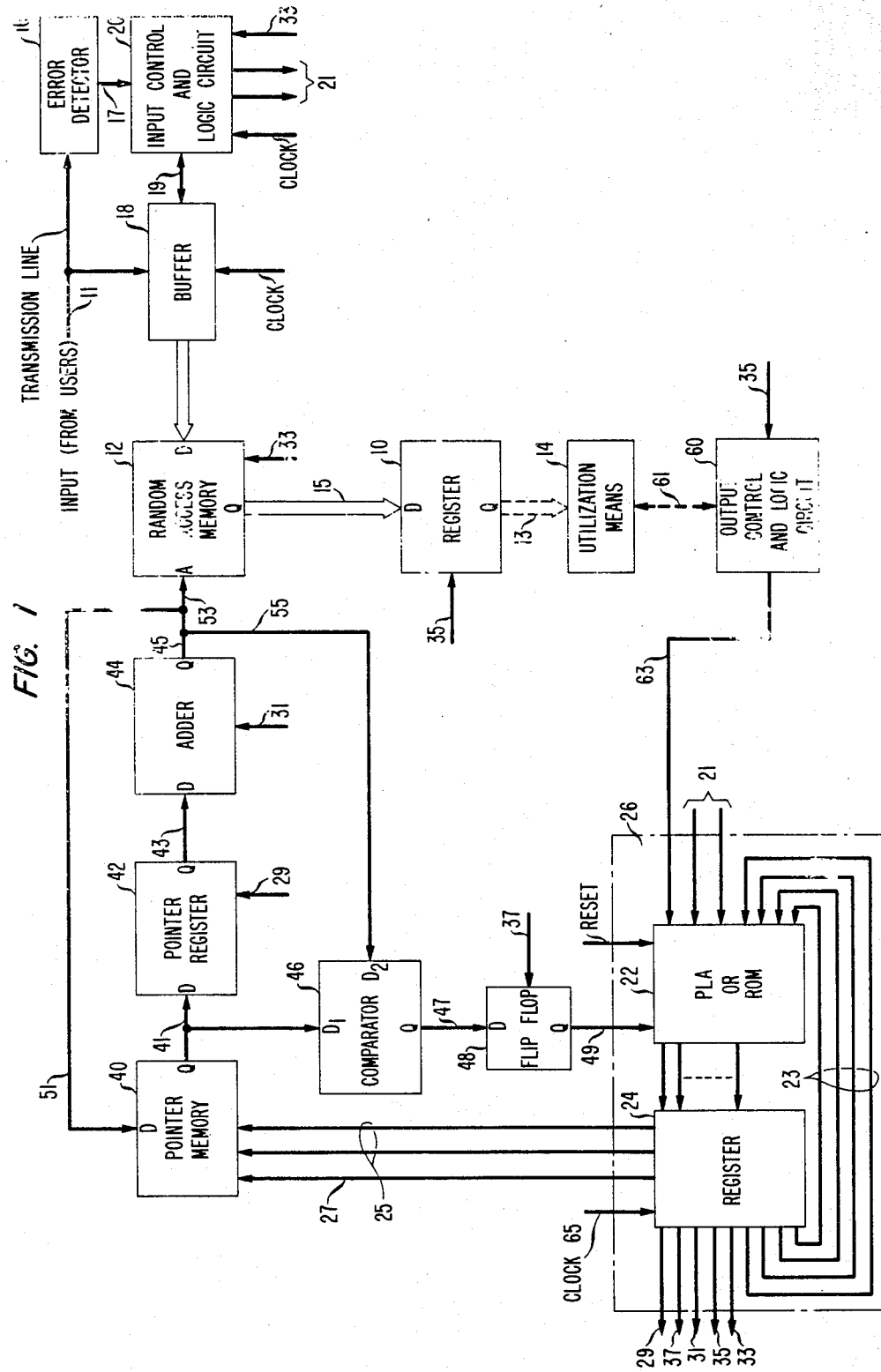
FIG. 1 discloses a single first-in, first-out queue.
Figures 2, 3, 5:
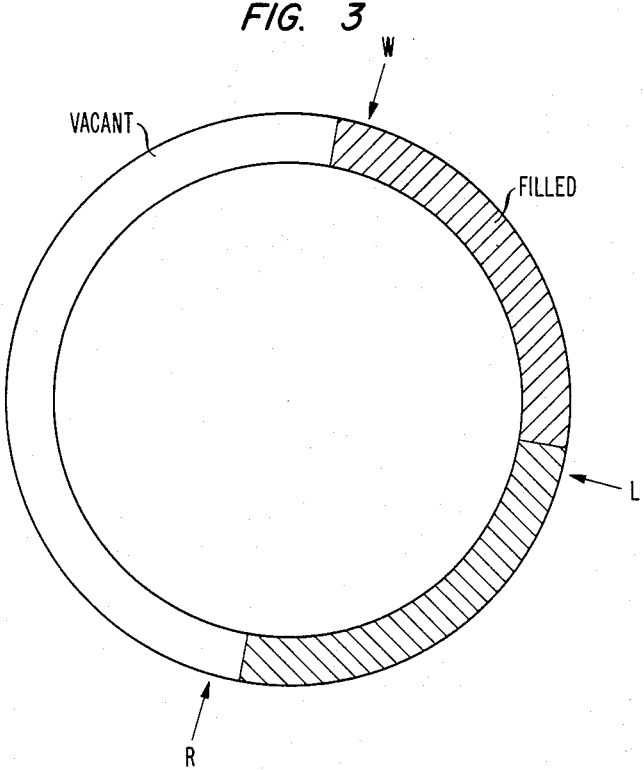
FIG. 2 represents one of many messages of digital bits.
FIG. 3 shows a diagram for visualizing the operation of the random access memory of FIG. 1.
FIG. 5 represents one of many packets of digital bits for transmission of information from a plurality of sources.

Referring to FIG. 1, there is shown a random access memory (RAM) 12 for storing information received over a transmission line 11. The information may be transmitted as a message comprising a plurality of information words. One such message is shown in FIG. 2. The format of a message may vary depending on the particular use. The message in FIG. 2 comprises a header 32, data 34, and end of message flag 36. The information words are stored in RAM 12, in FIG. 1, in the order in which they are received over line 11. After all the information words in a complete message have been entered in RAM 12, they are available for retrieval by a utilization means 14, such as a digital computer, a switching machine, and the like. When the message is retrieved from RAM 12, the first information word to be entered therein is read out first. That is, a first-in, first-out queue is realized using a random access memory, RAM 12.

As messages of data arrive, they are entered simultaneously into error detector 16 and buffer 18. If there exists no error resulting from transmission, lead 17 is enabled. Simultaneously, input control and logic circuit 20 receives information about the beginning and end of messages from buffer 18 to be described hereinbelow.

The use of RAM 12 may be explained by referring to FIG. 3. RAM 12 may be thought of as a circular storage device where information words, comprising a variable number of bits, may be stored. Thus, if the number of information words that may be stored in RAM 12 is denoted by N, the information words are entered sequentially in locations 0,1,2 ... N−1. After the location with address N−1 has been filled, the next location to be filled will have address 0. That is, successive locations can be addressed using modulo N arithmetic.

A pointer R addresses the location of the last word that was read from RAM 12. When a word is to be read out from RAM 12, pointer R is incremented by 1 modulo N and the contents of that word at location R+1 is read.

Likewise, a pointer W addresses the location where a word of information was last entered. Thus, when a word of information is to be entered into RAM 12, pointer W is incremented by 1 and the word is entered in the location whose address is W+1 modulo N.

The locations between R+1 modulo N and W represent the words of information available to be read from RAM 12. A message comprising a plurality of words of information is entered in RAM 12 when received but will not be available for being read from RAM 12 until all information in that message are entered therein. This is achieved by the use of a third pointer L.

When a complete message is received, the end of message flag 36, FIG. 2, carrying a special code is interpreted in the input control circuit 20, FIG. 1. This condition is transmitted over bus 21 to a programmable logic array (PLA) or a read only memory (ROM)22. Referring to FIG. 3 again, when a complete message is received, the contents of pointer W is copied into pointer L. That is, pointer L addresses the location of the last information word in the complete message.

Before a word is read from RAM 12, pointers R and L are compared. If they point to the same location, the queue does not have a complete message, and a word cannot be read from RAM 12. If pointers R and L address different locations, pointer R is incremented by 1 and the contents of location R+1 modulo N is read from RAM 12.

Because the memory is circular and is a random access memory, it is necessary to prevent destruction of valid data by insuring that pointer W will not be advanced beyond pointer R. According to the present invention, pointer W is maintained so that when incremented by 1, W+1 modulo N will never be equal to pointer R. That is, there is provided a cushion of one word location.

Referring again to FIG. 1, there is shown a pointer memory 40 which holds three addresses: pointers W, L, and R. In the illustrative embodiment, each pointer is twelve bits long. Pointer register 42 is large enough to hold a single pointer. Adder 44 is designed to add either zero or one modulo N to its input value, namely, an address indicated by pointer W, L or R. RAM 12 has one word location for every information word from buffer 18. Further RAM 12 has as many locations as can be addressed by a single pointer. Thus, in the illustrative embodiment, because each pointer has twelve bits, each pointer can address 4,096 words ($2^{12}$) in RAM 12, that is, N=4,096, in this illustration. Register 10 is wide enough to store a single word of information read from RAM 12. Comparator 46 compares the values of two addresses and produces an output. If the two addresses are equal, the output from comparator 46 is one, otherwise, the output therefrom is zero. Flip-flop 48 stores the output from comparator 46 and that output is made available over lead 49 to ROM 22.

The pointers W, R and L, as stated hereinbefore, address locations in RAM 12 so that information may be written therein or read therefrom. Pointers W and R move cyclically through RAM 12, one location at a time. As stated hereinbefore, RAM 12 may be conceptualized as a circular buffer having three pointers, W, R and L.

Pointer memory 40 is addressed by leads 25. The address, comprising two bits, indicates the pointer W, R, or L. Depending on the pointer location addressed, a pointer appears at the Q port and on bus 41. When a pointer, which appears on bus 51, is to be entered in pointer memory 40, the location is indicated by address leads 25 and the control lead 27 is enabled. The pointer on bus 41 appears at the D port of pointer register 42 and at the $D_1$ port of comparator 46.

The pointer on bus 41 at the D port is copied into pointer register 42 by enabling the control lead 29. The contents of pointer register 42 is always present at its Q port and on bus 43.

As stated hereinabove, adder 44 adds either zero or one modulo N to its input. The pointer, from pointer register 42, appears at the D port of adder 44 and the quantity, either a zero or a one, appearing on the input lead 31, are added. The resulting sum, pointer +0 (or 1) modulo N, appears at the output port Q and on bus 45. Bus 45 branches into three separate buses: 51, to the D port of pointer memory 40; 53, to the address port A of the RAM 12; and 55, to the $D_2$ port of comparator 46.

Words which are to be entered in RAM 12 appear at the D port thereof. The pointer indicating the address of the memory cell into which the word is to be entered appears at the A port thereof. When the control lead 33 is enabled, the word at the D port is entered into the memory cell of RAM 12 addressed by the pointer on bus 53.

Words which are to be read from RAM 12 are addressed by the pointer on bus 53 again through the A port. Thereafter, the words appear at the Q port of RAM 12 and via bus 15 at the D port of register 10. When control lead 35 is enabled, the word which was read from RAM 12 is entered into register 10 and appears at the Q port thereof and on bus 13.

The input values at the $D_1$ and $D_2$ ports of comparator 46 are compared. If the input values are equal, the output is one; otherwise, the output is zero. The output from comparator 46 is transmitted via bus 47 to the D port of flip-flop 48. When control lead 37 is enabled, the output from comparator 46 is entered in flip-flop 48. The value of flip-flop 48 is continuously present on lead 49 to the ROM 22.

ROM 22 and control register 24 together form a control circuit 26. When utilization means 14 is ready to receive a message, a signal is transmitted over bus 61 to output control and logic circuit 60. Thereafter, output control circuit 60 issues a read command over lead 63 to the ROM 22. Depending on the status of the eight leads 21, 23, 49 and 63 at the input to ROM 22, an instruction is read therefrom and is transferred to control register 24 simultaneously with a clock pulse on lead 65. The contents of register 24, namely the instructions from ROM 22, define the state of the device during the next clock period. Thus, the register 24 holds the current values for the twelve leads 23, 25, 27, 29, 31, 33, 35 and 37. The leads 23 carry a number, comprising four bits, which is fed back as an input to PLA 22 in order that the following state may be generated. The next state as defined by the next instruction from ROM 22 depends upon both the previous state identified by the number on leads 23 and the new inputs on control leads 21, 49 and 63.

Reading Information From a Single FIFO Queue

In response to a command from utilization means 14, during a first clock period, control circuit 26 causes the address of the R pointer to be transmitted over leads 25 to the pointer memory 40. Simultaneously therewith, control lead 29 is enabled thereby causing the aforesaid R pointer to be entered in pointer register 42. In a second clock period, the lead 31 carries the value zero so that the R pointer is passed intact through adder 44 and appears at the $D_2$ port of comparator 46. During the same second clock period, leads 25 carry the address of the L pointer to pointer register 40 and the L pointer appears at the $D_1$ port of comparator 46. The output from comparator 46 is entered in flip-flop 48 by enabling lead 37. If the queue is empty or does not have a complete message, pointers L and R are equal and the value on lead 49 is one. If the queue, however, has either a partially read message or at least one complete message, the value on lead 49 is zero.

During the third clock period, the value on lead 31 is a one and the adder 44 is allowed to settle down. The value of the output from adder 44, $R+1$, appears on bus 53 and points to the word to be read from RAM 12.

During the fourth clock period, if the value on lead 49 was zero during the second clock period, the lead 35 is enabled and a word, which was read from RAM 12 during the third clock period, is entered into register 10. The word is continuously available at the Q port of register 10 and on bus 13. Lead 35 also carries an input signal to the output control logic circuit 60 where it signifies when one word has been read.

During the aforesaid third clock period the incremented R pointer, namely $R+1$, appears on bus 51 at the D port of pointer memory 40. During the fourth clock period, leads 25 carry the address of the R pointer and lead 27 is enabled, thereby causing the incremented R pointer, $R+1$, on bus 51 to be entered as the new R pointer in pointer memory 40.

Writing Information into a Single FIFO Queue

In response to a word being received on line 11, input control circuit 20 transmits this status over leads 21 to control circuit 26. Thereafter, during a first clock period, leads 25 carry the address of the W pointer in pointer memory 40 and the W pointer thus addressed is entered in pointer register 42 by enabling lead 29. During the second clock period, the lead 31 carries the value one so that the output from adder 44 is $W+1$ which appears at the $D_2$ port of comparator 46. Simultaneously, the leads 25 carry the address of the R pointer in pointer memory 40 and the R pointer thus addressed appears at the $D_1$ port of comparator 46.

During the third clock period, the value of the signal on the lead 31 remains at one and the output from comparator 46 is entered in flip-flop 48 by enabling lead 37. If the output from comparator 46, namely, the contents of flip-flop 48, is zero, it means the R pointer and $W+1$ are not equal and the word at the D port of RAM 12 may be entered therein.

Thus, during the fourth clock period, if the R pointer and $W+1$ are not equal, the word at the D port of RAM 12 is entered in the location addressed by $W+1$ at the A port thereof by enabling lead 33. Lead 33 also carries an input signal to the input control circuit 20 and signifies when a word from buffer 18 has been entered in RAM 12.

During the same fourth clock period, leads 25 carry the address of the W pointer in pointer memory 40 and lead 27 is enabled so that the incremented value, $W+1$, of the W pointer on bus 51 may be entered in the pointer memory 40.

Signaling the Entry of a Complete Message in a Single FIFO Queue

When a complete message has been received, as indicated by the end of message flag 36, of FIG. 2, leads 21, in FIG. 1, carry this status to the control circuit 26. In response thereto, the L pointer is updated. This updating requires two clock periods.

During the first clock period, leads 25 carry the address of the W pointer in pointer memory 40. The lead 29 is enabled and the W pointer is copied into the pointer register 42. During the second clock period lead 31 carries the value zero. Thus, the W pointer appears on bus 51. The leads 25 carry the address of the L pointer in pointer memory 40. Lead 27 is enabled thereby copying the value of the W pointer on bus 51 into the L pointer.

Resetting the Single FIFO Queue

The FIFO queue is reset, or initialized, to render the queue empty by copying the value of the R pointer into the L and W pointer locations in pointer memory 40. This process requires three clock periods.

During the first clock period, the leads 25 carry the address of the R pointer in pointer memory 40 and the R pointer is entered in pointer register 42 by enabling lead 29.

During the second clock period, the value on lead 31 is zero so that the R pointer appears on bus 51. The leads 25 carry the address of the L pointer and by enabling lead 27 the value of the R pointer is copied into the L pointer location in pointer memory 40.

Likewise, during the third clock period, the value on lead 31 remains at zero so that the R pointer continues to appear on bus 51. The leads 25 carry the address of the W pointer and by enabling lead 27 the value of the R pointer is copied into the W pointer location.

Contention Resolution in a Single FIFO Queue

If both write command leads 21 and read command lead 63 are simultaneously enabled, the control circuit 26 gives priority to the write command leads 21, even if the FIFO queue is full and the operation cannot be completed. The next operation should be the read command assertion on lead 63.

Input Control Process for a Single FIFO Queue

As stated hereinabove, when an information word is received it is placed in buffer 18 and in error detector 16. With the complete entry of each word in buffer 18, input control circuit 20 transmits a command over leads 21 to ROM 22 thereby causing the information word in buffer 18 to be transferred therefrom and entered into RAM 12.

As stated hereinabove, after each information word is entered in error detector 16, the presence or absence of a transmission error is detected therein. If no transmission error had been detected, lead 17 is enabled. Meanwhile, each word entered in buffer 18 is compared with an end of message flag. When an end of message is detected, that condition is transmitted over bus 19 to input control circuit 20.

When lead 17 is enabled and an end of message signal is received over bus 19 from buffer 18, the input control circuit 20 transmits a command over leads 21 to ROM 22. In response thereto, the address in the W pointer is copied into the L pointer, thereby signifying the entry of a complete message in RAM 12. Thereafter, this message may be read from RAM 12.

Should an error in transmission be detected in error detector 16, however, lead 17 will not be enabled. In the absence of a signal on lead 17, a different command is transmitted from input control circuit 20 over leads 21 to ROM 22. In response thereto, the address in the L pointer is copied into the W pointer, thereby returning the W pointer to an initial position. As a result, no erroneous information words are retained in RAM 12.

First in, First-out Queues for Multiple FIFO Queues

Figure 4:
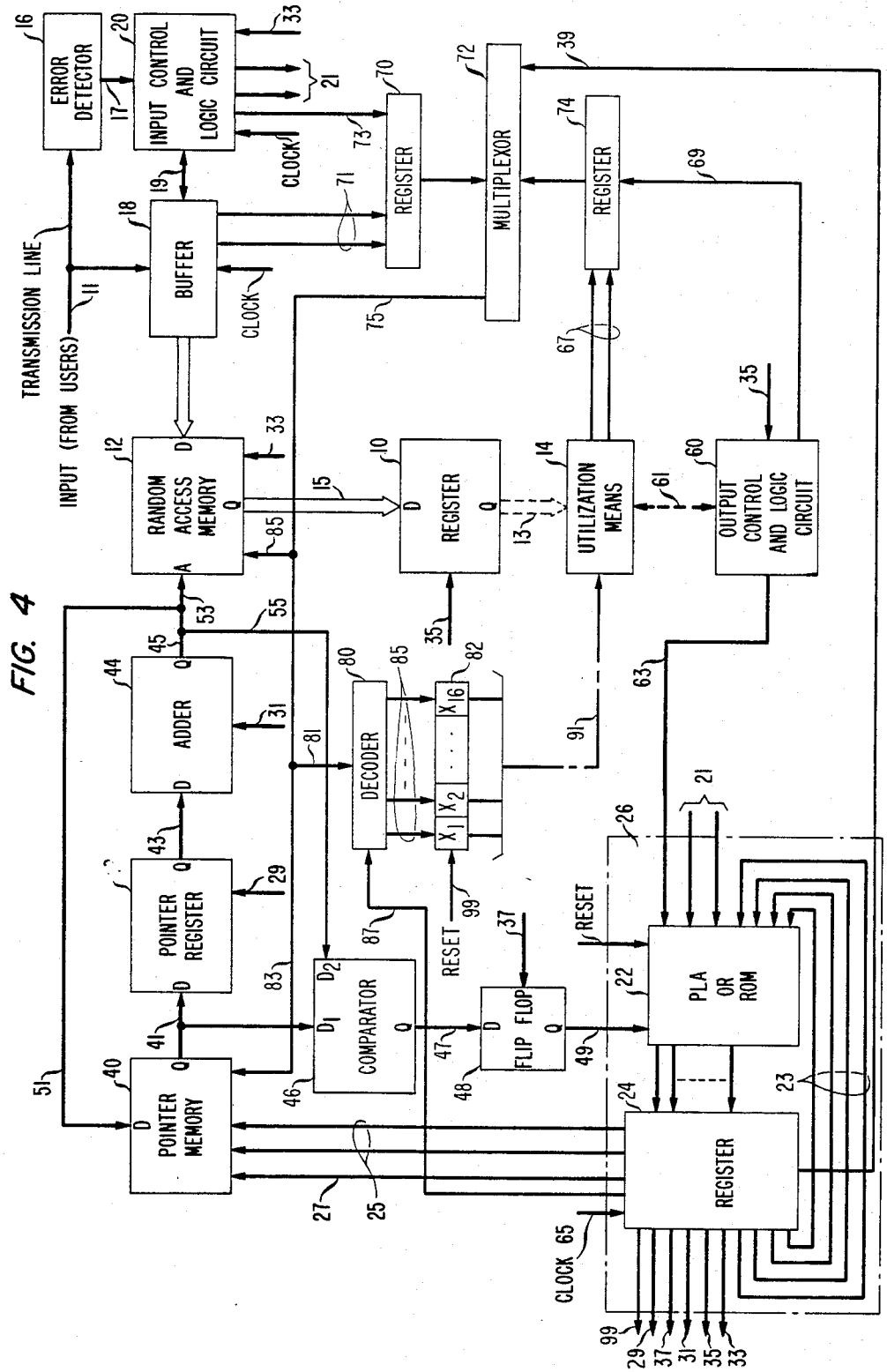
FIG. 4 discloses a system comprising a plurality of first-in, first-out queues for storing a plurality of packets.

Referring to FIG. 4, there is shown a system for implementing a plurality of first-in, first-out queues for storing a plurality of packets received over transmission line 11. The packets are transmitted as packets of digital bits from one or more sources. One such packet is shown in FIG. 5. This packet is similar to that shown in FIG. 2 for the transmission of single messages with the addition of a source identification number 38 for associating the packet with a source. The data block 34, in FIG. 5, may have one or more words, each word comprising a plurality of information bits.

The packets are entered in error detector 16 and buffer 18 simultaneously. If no transmission errors are detected in error detector 16, input control circuit 20 indicates that the source identification number has been entered in buffer 18. Thereafter, lead 73 is enabled, permitting the entry of the source identification number over leads 71 in the register 70.

When an information word has been entered in buffer 18, that information is conveyed to the input control circuit 20 over bus 19, as stated hereinabove with reference to FIG. 1. The leads 21 to control circuit 26 are then enabled. In response thereto, during a first clock period, leads 25 carry the address of the W pointer in pointer memory 40. Simultaneously therewith, lead 39 is enabled thereby causing the channel number in register 70 to be gated through multiplexor 72. The source identification number appears on lead 75 which branches into three further leads: lead 85 carries the source identification number to the random access memory 12, lead 83 carries the source identification number to pointer memory 40, and lead 81 carries the source identification number to decoder 80. Leads 25 and 83 carry the information required to identify the particular W pointer to be read from pointer memory 40.

More particularly, random access memory 12 is organized to store a plurality of packets. As stated above, each packet is identified by a source identification number. Further, each packet comprises one or more words. As stated hereinabove with reference to a single FIFO queue in FIG. 1, three pointers, W, R and L are used for reading words from RAM 12 or writing words therein. It is necessary, therefore, to have a separate set of pointers for each source or FIFO queue. These sets of pointers are stored in pointer memory 40. Thus, lead 83 identifies the particular set of pointers and leads 25 identify the particular pointer in that set. Whereas a set of three pointers is being described for controlling the read out of complete messages, it is understood that only two pointers, W and R, need be used if it is acceptable to read out from any queue when only a part of a message has been stored therein.

Thereafter, the process of writing a word from buffer 18 into RAM 12 proceeds in substantially the same manner as for a single FIFO queue, described hereinabove. When bus 53 is used to convey the address of the word location in RAM 12, however, the correct word location is addressed because the source identification number appears on bus 85.

When a complete message has been received, the end of message flag 36 in the last packet conveys this information via buffer 18 and input control circuit 20 to the control circuit 26. In response thereto, lead 87 is enabled permitting decoder 80 to enable one of the leads 85 corresponding to the particular source identification number on lead 81. The enabled one of leads 85 causes the corresponding register in the set of registers 82 to change state from a zero to a one. Periodically, utilization means 14 reads the state of the FIFO queues as entered in the set of registers 82 via the leads 91.

When utilization means 14 is ready to read from a FIFO queue, the information received over leads 91 is used to select a FIFO queue that has at least one packet stored therein. The source identification number corresponding to that queue is transmitted over bus 67 to register 74. Simultaneously, the request for read-out is conveyed via bus 63 to control circuit 26, and register 74 is enabled by lead 69 causing the source identification number to be entered therein from utilization means 14. Lead 39 is enabled by control circuit 26 causing multiplexor 72 to gate the source identification from register 74 onto bus 75 and, in turn, buses 83 and 85. As stated hereinabove, bus 83 conveys the source identification number to pointer memory 40, thereby addressing the particular set of pointers to be accessed. Likewise, bus 85 conveys the source identification number to RAM 12, thereby addressing the particular packet, or FIFO queue, to be read therefrom. The remaining process of reading from the FIFO queue is substantially similar to that described hereinabove for a single FIFO queue with reference to FIG. 1.

As stated hereinabove with reference to FIG. 1, when utilization means 14 attempts to read a packet from a FIFO queue in RAM 12 a comparison of the pointers stored in pointer memory 40 is made. The result of this comparison is transmitted over lead 49 to the control circuit 26. Thus when utilization means 14 attempts to read a FIFO queue that is empty, this condition will be transmitted over lead 49. Thereafter, reset lead 99 is enabled by control circuit 26, thereby resetting the register, associated with the FIFO queue being read, in the set of registers 82.

A FIFO queue is reset, or initialized, to render the queue empty by using the procedure described hereinabove with reference to FIG. 1 for single FIFO queues but with the additional step of resetting to state zero the corresponding register in the set of registers 82.

Figure 6:
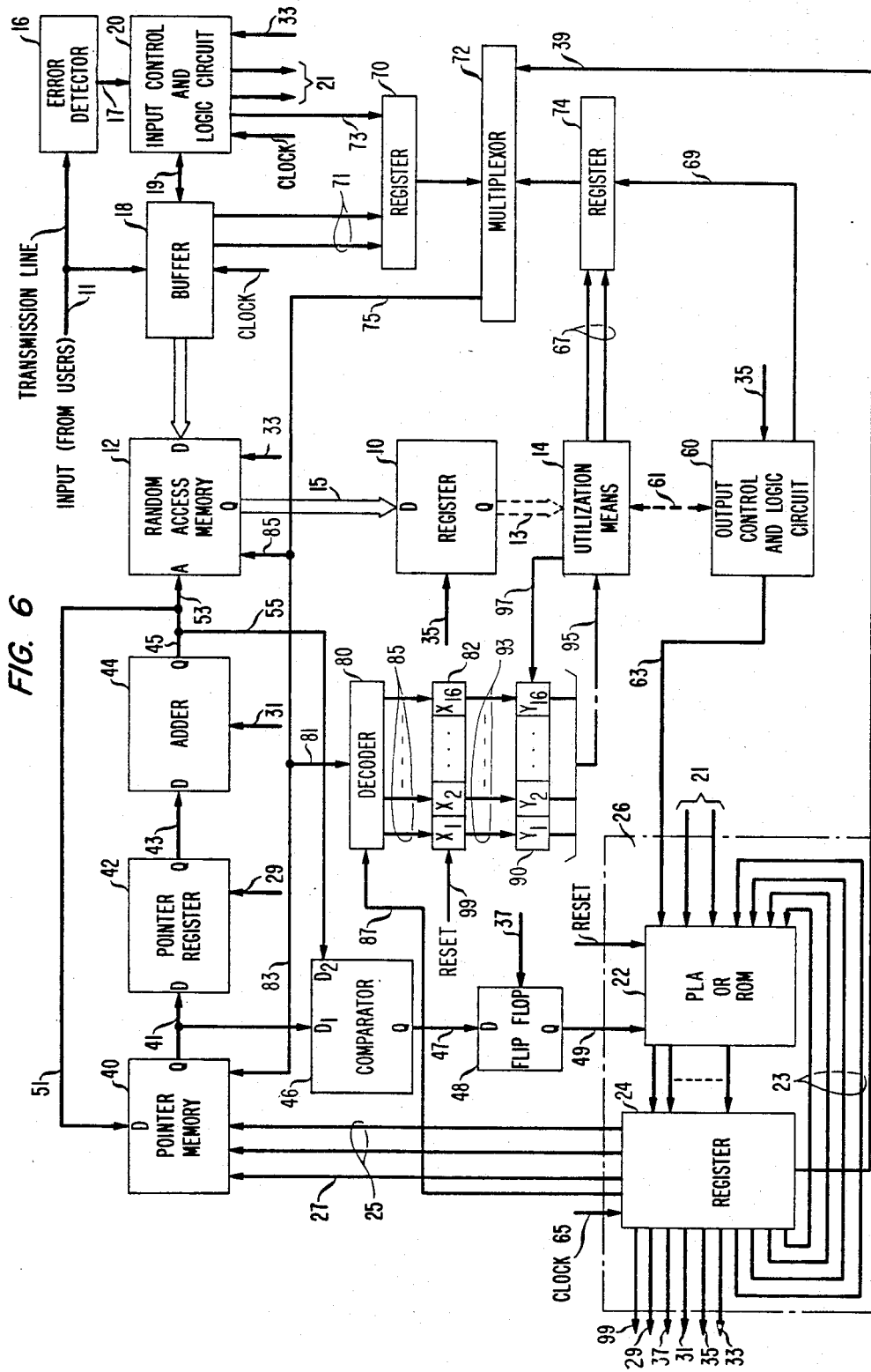
FIG. 6 discloses yet another system comprising a plurality of first-in, first-out queues for storing a plurality of packets.

Referring to FIG. 6, there is shown yet another system of a plurality of FIFO queues. This system operates substantially similar to that described with reference to FIG. 5 except for the following improvement. The contents of the set of registers 82 may be transferred over leads 93 and entered in a second set of registers 90 in response to an enabling signal on lead 97. The status of each FIFO queue as registered in the set of registers 90 is available to utilization means 14 over bus 95. This status is sequentially scanned by utilization means 14 and for each queue containing at least one packet, some data is read by utilization means 14. After a single scan of the set of registers 90, utilization means 14 enables the transfer of the contents of the set of registers 82 into the set of register 90. This cycle is repeated indefinitely.

Reading, writing and resetting from each queue occurs in some manner as described hereinabove with reference to FIG. 5. Likewise, resetting the set of registers 82 occurs as described hereinabove with reference to FIG. 5.

What is claimed is:

1. Apparatus for temporarily storing a plurality of packets in a plurality of first-in, first-out queues, each of said packets comprising one or more information bits being received on a transmission line as a multiplexed stream of said packets transmitted from a plurality of sources, each of said packets being identified with one of said sources, said apparatus characterized by means for identifying said source of each of said packets, means for assigning each of said packets to one of said first-in, first-out queues, means for storing said packets in said first-in, first-out queues, and means for indicating when each of said first-in, first-out queues has at least one of said packets stored therein, said indicating means further comprising means for registering the change of state in response to said first-in, first-out queue having entered therein at least one of said packets, and means for periodically and simultaneously reading and storing therein the status of all of said first-in, first-out queues registered in said change of state means.

2. The apparatus according to claim 1 wherein said storage means comprises a random access memory.

3. A method for temporarily storing a plurality of packets in a plurality of first-in, first-out queues, each of said packets comprising one or more information bits, said packets being received on a transmission line as a multiplexed stream of said packets from a plurality of sources, each of said packets being identified with one of said sources, said method comprising the steps of (1) identifying each of said sources of each of said packets;

(2) assigning each of said packets to one of said first-in, first-out queues, (3) storing said packets in said first-in, first-out queues, and (4) indicating when each of said first-in, first-out queues has entered therein at least one of said packets, said indicating step further comprising the steps of registering when at least one of said packets has been entered in any of said first-in, first-out queues, periodically, and simultaneously, reading the status of all of said first-in, first-out queues, and storing said status.

* * * * *